United States Patent [19]

Okubo

[11] Patent Number: 4,722,413

[45] Date of Patent: Feb. 2, 1988

[54] FOUR-WHEEL DRIVE SYSTEM

[75] Inventor: Kiyokazu Okubo, Saitama, Japan

[73] Assignee: Honda Giken Kogyo Kabushiki Kaisha, Tokyo, Japan

[21] Appl. No.: 722,706

[22] Filed: Apr. 12, 1985

[30] Foreign Application Priority Data

Apr. 14, 1984 [JP] Japan ............................. 59-55074[U]
Apr. 14, 1984 [JP] Japan ............................. 59-55075[U]

[51] Int. Cl.⁴ .................... B60G 23/08; B60G 17/344
[52] U.S. Cl. ........................................ 180/247; 74/701
[58] Field of Search ............... 180/247, 233, 248, 249, 180/250; 74/701, 665 GC

[56] References Cited

U.S. PATENT DOCUMENTS

| | | | |
|---|---|---|---|
| 2,152,771 | 4/1939 | Ormsby | 74/701 |
| 2,384,781 | 9/1945 | Rockwell et al. | 180/247 |
| 2,913,929 | 11/1959 | Anderson | 180/247 |
| 3,763,948 | 10/1973 | Eggleton et al. | 180/247 |
| 4,422,520 | 12/1983 | Kodama et al. | 180/247 |
| 4,431,079 | 2/1984 | Suzuki | 180/247 |

FOREIGN PATENT DOCUMENTS 55-83119 7/1980 Japan .
501498 7/1938 United Kingdom ................ 180/247

Primary Examiner—David M. Mitchell
Assistant Examiner—Karin L. Ferriter
Attorney, Agent, or Firm—Lyon & Lyon

[57] ABSTRACT

A four-wheel drive system with a multi-speed transmission connected to the vehicle engine, the output shaft of the transmission having a gear engaging a gear on casing of a differential for rotating same, the differential including the first pair of wheel axles of the vehicle, and a separate gear on the differential casing engaging an input gear in a transfer mechanism having a drive shaft to the second pair of wheel axles. The transfer mechanism includes a clutch and the input gear is rotatably supported on the casing as well as supporting the shaft having the clutch.

4 Claims, 1 Drawing Figure

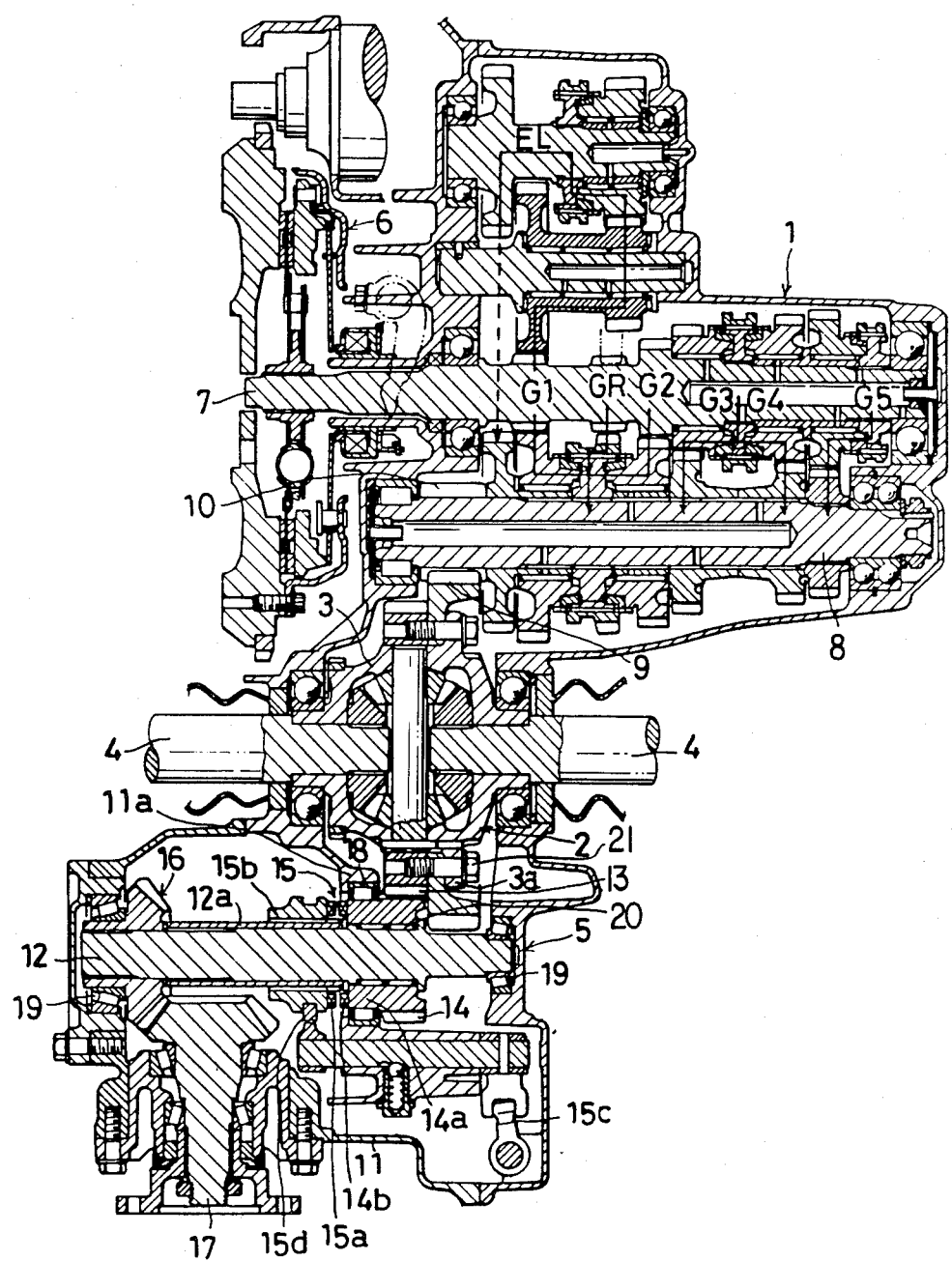

FOUR-WHEEL DRIVE SYSTEM

The present device relates to a four-wheel drive system and in particular to the type in which the drive power from a multi-speed transmission is transmitted through a differential mechanism to first axles and through the differential casing of said differential mechanism and a transfer mechanism to a drive shaft for second axles.

A system of this type is disclosed in the prior art in Japanese Utility Model Laid-Open No. 55-83119, which comprises: a differential mechanism including a differential casing connected through an input gear to an output gear on an output shaft of a multi-speed transmission; first axles are arranged in said differential mechanism in parallel with said output shaft; and a transfer mechanism including a transfer shaft extending in parallel with said first axles for transmitting the drive power from said differential casing to a drive shaft and then to second axles. The system thus disclosed is generally constructed such that the input gear fixed on said differential casing is made to mesh with the output gear on said output shaft and such that an input gear on said transmission shaft is made to mesh with the input shaft of said differential casing so that the drive power from said differential casing is transmitted to said second axles, and has the following disadvantages:

(i) In case the output gear of the transmission and the input gear of the differential mechanism have their diameters changed so as to change the final reduction ratio, the input gear of the transfer shaft has to have its diameter changed so as to leave the position of said transfer shaft unchanged. Thus, the gear ratio between the two input gears is changed so that the revolving speeds of the first and second axles fail to coincide if they are left as they are. This makes it necessary to change the gear ratio of the transfer system from said transfer shaft to the second axles so that the revolving speed of the second axles may become coincident with that of the first axles. As an alternative, the transfer shaft may have its position changed to prevent changing the gear ratio of the aforementioned two input gears but this makes it necessary to replace the transfer casing.

(ii) The inter-axis spacing between the first axles and the transmission shaft has to be retained at the sum of the radii of the input gear of the differential mechanism and the input gear on the transfer shaft. Since the input gear of the differential mechanism has a relatively large diameter from the relationship of the reduction ratio, the transfer must be enlarged if it is desired to retain the inter-axis spacing having a summed value of the larger diameter and the radius of the input gear on the transfer mechanism shaft.

Furthermore, in the system disclosed in the aforementioned Japanese Utility Model Laid-Open No. 55-83119, in which the input shaft of the transfer mechanism is arranged in a transfer casing in parallel with first axles such that it is connected in a releasable manner through a clutch to the input gear coacting with the differential casing of the differential mechanism, the transfer input shaft is divided into two halves, one of which is equipped with a gear mechanism connected to the second axles whereas the other is formed integrally with the input gear coacting with the differential casing such that the two divided shaft halves are fitted rotatably one in the other and supported rotatably at their two ends in the transfer casing through bearings such that the clutch is fitted on the outer circumference of the fitted portion of the two shaft halves to connect the two shaft halves in a releasable manner. As a result, the construction is extremely complicated while it is also possible to make the transfer input shaft of an integral construction so that a separate input gear is borne on the input shaft, the bearing portion is subject to misalignment by reason of the drive power from the differential casing thereby creating another disadvantage of a meshing error at the gear meshing portion between the input gear and the differential casing gear and also at the meshing portion of the clutch.

An object of the present invention is to provide a four-wheel drive system free of the aforesaid defects and which employs separate differential casing gears for meshing with the output gear of the multi-speed transmission and with the input gear of the transfer mechanism to allow versatility in gear ratio selection and simplicity of construction.

The present device has as a further object to provide a drive system which has an integral input shaft in the transfer mechanism but eliminates the aforementioned disadvantages by being constructed such that the input gear meshing with the gear on the differential casing of the differential mechanism is both borne on that input shaft and supported in the transfer casing by a bearing on the outer circumference of a portion of said input gear.

The present device will be described in the following in connection with the preferred embodiment thereof with reference to the single accompanying drawing which is a sectional elevation of the drive system.

The major components of the drive system are a multi-speed transmission 1, a differential mechanism 2, which is equipped with a differential casing 3 having a built-in differential gear mechanism, a pair of right and left first axles 4 connected to the differential mechanism 3 and a transfer mechanism 5 for transmitting the drive power from said differential casing 3 to a drive shaft 17 and then a second axles (not shown) in any conventional manner. The transmission 1 is equipped with an input shaft 7, which is connected through a main clutch 6 to the crankshaft of the engine, and an output shaft 8 which is arranged in parallel with the input shaft 7. Between those two shafts 7 and 8, there is interposed a six-speed forward and one-speed reverse reduction mechanism, which is composed of forward gear trains G1 to G5, a reverse gear train GR and a very slow gear train EL, so that any one of the speeds may be selectively established in a conventional manner.

The differential mechanism 2 is connected through an input gear 9, which is fixed on the circumference of said differential casing 3, to an output gear 10 on the output shaft 8 of the transmission 1. The first axles 4 and 4 are mounted in the center of revolution of the differential casing 3 and parallel to transmission shafts 7 and 8. The transfer mechanism 5 is equipped with an input shaft 12 which is arranged in transfer casing 11 in parallel with said first axles 4 and 4, an input gear 14 which meshes with a drive gear 13 fixed on the differential casing 3, a clutch 15 which is interposed between the input shaft 12 and the input gear 14, and the second axle drive shaft 17 which is connected to the input shaft 12 through a bevel gear mechanism 16 and which extends in a direction perpendicular to the input shaft 12.

The present invention differs from the aforedescribed prior art in providing the two gears 9 and 13 rather than one, both of which are fixed on the differential casing 3 of said differential mechanism 2. The input gear 9 of said differential mechanism 2 and said differential casing 3 are constructed such that said input gear 9 is fitted on the outer circumference of said differential casing 3 and fastened to the flange 3a of said differential casing 3 by means of bolts 21. Said transmission shaft drive gear 13 is held in abutment against the side of said input gear 9 and also is fastened together by the bolts 21.

Also according to the present invention, the input gear 14 is borne on the input shaft 12 and supported on the transfer casing 11 by a bearing 18 fitted on the outer circumference of the stem 14a of said input gear 14. The input shaft 12 is rotatably supported at both its ends in the transfer casing 11 by means of bearings 19 and 19 and is equipped at its one side (at the lefthand side as viewed in the drawing) with said bevel gear mechanism 16 and at its other side (at the righthand side as viewed in the drawing) with said input gear 14 which is borne by a bearing 20. The stem 14a extending integrally from said input gea 14 has its outer circumference supported by the bearing 18 directly on an intermediate wall 11a of the transfer casing 11.

The aforementioned clutch 15 is constructed with a clutch sleeve 15b having dogs 15a facing dogs 14b at the axial end of the input gear 14 and the clutch sleeve 15b is splined to a sleeve 12a fixed on the input shaft 12 to rotate therewith. As a result, said input shaft 12 can be connected to and disconnected from said input gear 14 by sliding said clutch sleeve 15b by means of a shift fork 15d and an actuating lever 15c. This improved construction of the transfer mechanism is useable whether the input gear 14 meshes with gear 13, as shown, or directly with the gear 9 if it is desirable to eliminate gear 14 but then the other above-described advantages are lost.

Next, the operation of the preferred embodiment will be described. The drive power from the engine is transmitted from the output gear 10 of the transmission 1 to the input gear 9 of the differential mechanism 2 and through said differential mechanism 2 to the first axles 4 and 4, and also is transmitted from the transmission shaft drive gear 13 of the differential mechanism 2 to the input gear 14 on the input shaft 12 of transfer mechanism 5 and through the clutch 15, the bevel gear mechanism 16 and the second axle drive shaft 17 to the second axles 22, which are conventional and only shown diagrammatically.

With the arrangement of this invention, the output gear 10 on the output shaft 8 and the input gear 9 of the differential mechanism 2 may be replaced for changing the final reduction ratio without changing the inter-axis spacing between the output shaft 8 of the transmission 1 and the first axles 4 and 4 of the differential mechanism 2 and the relationship between the drive gear 13 of the differential mechanism 2 and the input gear 14 on the transfer mechanism shaft 12 is left unchanged. As a result, the revolving speeds of the first axles 4 and 4 and the second axles do not become inconsistent with each other whereby it is unnecessary to change the gear ratio of the drive line extending from the casing of the transfer mechanism 5 to the second axles.

Moreover, in event the diameters of the wheels of the first axles 4 and 4 and the wheels of the second axles are different from each other, the circumferential speeds of all the wheels can be made coincident with each other by replacing the drive gear 13 of the differential mechanism 2 and the input gear 14 on the transfer input shaft 12. Even in such a case it is unnecessary to replace the transfer casing or the like of the transfer 5.

Moreover, the input gear 9 of the differential mechanism 2 has a relatively large diameter in relation to the final reduction ratio, but the drive gear 13 is not restricted so that it can have a relatively small diameter. The differential mechanism can be constructed such that the input gear 14 on the shaft 12 can be positioned inside of the input gear 9 of the differential mechanism 2 by the difference between the radius of the input gear 9 and the radius of the drive gear 13. As a result, it is possible to reduce the inter-axis spacing between the first axles 4 and 4 of the differential mechanism 2 and the transmission shaft 12 of the transfer mechanism 5.

It is to be noted that the drive power from the drive gear 13 of the differential mechanism 2 is exerted upon the input gear 14 on said input shaft 12 in essentially the same manner as the prior art. However, the input gear 14 of this invention has its stem 14a supported at its outer circumference in the transfer casing 11 by the bearing 18 to avoid any possibility of misalignment. Moreover, the input shaft 12 is supported in the transfer casing 11 through the input gear 14 and bearings 18 and 20 to have its support rigidity enhanced whereby it can be of a relatively small diameter. At the same time, as compared with a construction in which the input shaft 12 is supported at its intermediate portion directly in the transfer casing 11 through a separate bearing, the input shaft 12 can be shortened by the width of the bearing. Moreover, since the bearing 18 is mounted on the stem 14a which has a larger diameter than that of the input shaft 12, the bearing capacity is increased.

The invention claimed is:

1. In a four-wheel drive system for a vehicle having first and second pairs of axles, a multi-speed transmission with an output shaft having a spur gear, a differential mechanism including the first pair of axles, and a transfer mechanism with an input spur gear on an input shaft and a drive shaft connected to the second pair of axles with gears connecting the input shaft and drive shaft, the improvement comprising, a first spur gear on the differential mechanism engaging the output shaft spur gear of the transmission for causing rotation of the differential mechanism and first pair of axles, a second spur gear on the differential mechanism engaging the input spur gear of the transfer mechanism for rotating same and the drive shaft and the second pair of axles, the axes of the transmission output shaft and transfer mechanism input shaft and the axis of the first pair of axles all being parallel and in fixed locations, the said first spur gear and the transmission output shaft spur gear being selectively removable and replaceable by a pair of spur gears having the same sum of the diameters of those spur gears for changing the drive ratio from the transmission to the first and second pairs of axles, the said second spur gear and the input spur gear of the transfer mechanism being selectively removable and replaceable by a pair of spur gears having the same sum of the diameters of those spur gears for changing the ratio of rotation between the first pair of axles and the drive shaft to the second pair of axles, and said first spur gear and second spur gear being positioned immediately adjacent each other and jointly bolted to the differential mechanism.

2. The drive system of claim 1 wherein the transfer mechanism includes a casing and an input shaft rotatably supported on the casing by bearings at each end, the input gear is rotatably supported on said input shaft and has a stem, and another bearing near the middle of said input shaft rotatably supports the input gear at the stem.

3. The drive system of claim 2 wherein the transfer mechanism includes a clutch with clutch dogs on the input gear and a clutch sleeve with clutch dogs slidably mounted on said input shaft for selectively engaging the input gear clutch dogs.

4. The drive system of claim 1 wherein said drive shaft and transfer mechanism input shaft are perpendicular with bevel gears connecting same, and said transfer mechanism input shaft is of a length for locating the drive shaft at the center of the vehicle.

* * * * *